United States Patent
Shimizu et al.

(10) Patent No.: US 11,040,515 B2
(45) Date of Patent: *Jun. 22, 2021

(54) RELEASE FILM AND METHOD FOR MANUFACTURING SAME

(71) Applicant: UNITIKA LTD., Hyogo (JP)

(72) Inventors: Mari Shimizu, Kyoto (JP); Kouhei Tanaka, Kyoto (JP); Nobuyasu Okumura, Kyoto (JP)

(73) Assignee: Unitika Ltd., Hyogo (JP)

( * ) Notice: Subject to any disclaimer, the term of this patent is extended or adjusted under 35 U.S.C. 154(b) by 40 days.

This patent is subject to a terminal disclaimer.

(21) Appl. No.: 16/333,711

(22) PCT Filed: Sep. 20, 2017

(86) PCT No.: PCT/JP2017/033795
§ 371 (c)(1),
(2) Date: Mar. 15, 2019

(87) PCT Pub. No.: WO2018/056276
PCT Pub. Date: Mar. 29, 2018

(65) Prior Publication Data
US 2019/0224945 A1    Jul. 25, 2019

(30) Foreign Application Priority Data

Sep. 20, 2016  (JP) .............................. JP2016-182501

(51) Int. Cl.
| | |
|---|---|
| *B32B 7/06* | (2019.01) |
| *B29C 55/02* | (2006.01) |
| *B29C 55/14* | (2006.01) |
| *B29C 55/12* | (2006.01) |
| *B32B 27/30* | (2006.01) |
| *B32B 27/36* | (2006.01) |
| *B32B 27/00* | (2006.01) |
| *B32B 27/26* | (2006.01) |
| *C08J 5/18* | (2006.01) |
| *B29K 29/00* | (2006.01) |
| *B29K 67/00* | (2006.01) |
| *B29K 33/00* | (2006.01) |

(52) U.S. Cl.
CPC .............. *B32B 7/06* (2013.01); *B29C 55/023* (2013.01); *B29C 55/143* (2013.01); *B32B 27/00* (2013.01); *B32B 27/306* (2013.01); *B32B 27/308* (2013.01); *B32B 27/36* (2013.01); *C08J 5/18* (2013.01); *B29C 55/12* (2013.01); *B29K 2029/04* (2013.01); *B29K 2033/08* (2013.01); *B29K 2067/00* (2013.01); *B29K 2995/0053* (2013.01); *B32B 27/26* (2013.01); *B32B 2307/748* (2013.01); *C08J 2323/06* (2013.01); *C08J 2423/08* (2013.01)

(58) Field of Classification Search
CPC ........ C09D 129/04; C09D 151/06; C08J 7/04; C08J 7/0427
See application file for complete search history.

(56) References Cited

U.S. PATENT DOCUMENTS

| | | | |
|---|---|---|---|
| 2011/0151167 A1 | 6/2011 | Okumura et al. | |
| 2013/0224505 A1* | 8/2013 | Echt ....................... | B32B 27/10 428/511 |
| 2015/0322278 A1 | 11/2015 | Araki | |
| 2015/0367610 A1 | 12/2015 | Araki et al. | |

FOREIGN PATENT DOCUMENTS

| | | |
|---|---|---|
| CN | 101687405 | 3/2010 |
| CN | 104768759 | 7/2015 |
| EP | 2 179 844 | 4/2010 |
| EP | 2 944 463 | 11/2015 |
| JP | 08-176372 | 9/1996 |
| JP | 09-077890 | 3/1997 |
| JP | 2001-105547 | 4/2001 |
| JP | 2010-188693 | 9/2010 |
| JP | 2015-189014 | 11/2015 |
| WO | 2014/109340 | 7/2014 |
| WO | 2014/109341 | 7/2014 |

OTHER PUBLICATIONS

Kuraray PVA data sheet, Liwei Chemical Company. (Year: 2008).*
EXCVAL(TM) product information sheet, Kuraray. (Year: 2020).*
International Search Report in corresponding PCT application No. PCT/JP2017/033795, dated Nov. 28, 2017.
English language machine translation of JP2001-105547.
English language machine translation of JP09-077890.
English language machine translation of JP08-176372.
English language machine translation of JP2015-189014.
Supplementary European Search Report dated Aug. 22, 2019 in corresponding European Patent Application No. 17853046.5.
English language machine translation of JP 2010-188693.
Chinese Office Action dated Jul. 3, 2020 in corresponding Chinese Patent Application No. 201780057530.1 and English translation.

* cited by examiner

*Primary Examiner* — Ramsey Zacharia
(74) *Attorney, Agent, or Firm* — Fildes & Outland, P.C.

(57) ABSTRACT

There is provided a release film comprising a substrate film and a resin layer provided on at least one surface of a substrate film, wherein the resin layer comprises 100 parts by mass of an acid-modified polyolefin resin, 1 to 20 parts by mass of a crosslinking agent and 10 to 1,000 parts by mass of a polyvinyl alcohol having a saponification rate of 99% or lower.

6 Claims, No Drawings

RELEASE FILM AND METHOD FOR MANUFACTURING SAME

TECHNICAL FIELD

The present invention relates to a release film and a method for manufacturing same.

BACKGROUND ART

Release films are broadly used in medical fields and industrial fields. Specific examples thereof include process materials for manufacturing printed wiring boards, flexible printed wiring boards, multilayer printed wiring boards and the like, and protection materials for protecting medical tapes, poultices, pressure-sensitive adhesive materials and liquid crystal display components and the like.

Patent Literature 1 discloses a release film having, as a release layer, an acid-modified polyolefin resin layer having releasability good for various adherends.

CITATION LIST

Patent Literature

Patent Literature 1: International Publication No. WO2014/109340

SUMMARY OF INVENTION

Technical Problem

In the release film described in Patent Literature 1, however, when high planarity is demanded for adherends after releasing, the surface condition thereof cannot be said to be sufficient in some cases. In detail, in the release film described in Patent Literature 1, unevenness is generated when a resin layer is coated on a substrate to thereby generate continuous streaky, discrete or otherwise fine nonplanar shapes of about several tens nm to several hundred nm in height on the surface of the resin layer, which are transferred to the adherends to thereby reduce the quality of the adherends in some cases.

Further in the release film described in Patent Literature 1, when the release film is stored for a long period in a high-humidity environment in marine transportation, rainy season and the like, warpage is generated on ends of the film, and there is caused in some cases such trouble that when the release film is used as a release film, the warped ends cannot protect adherends.

The present invention, in consideration of these problems, provides a release film better in coating film uniformity and high in quality, in which the generation of fine nonplanar shapes of about several tens nm to several hundred nm in height can be prevented, and in which when the release film is stored for a long period in a high-humidity environment, warpage of film ends is suppressed.

Solution to Problem

As a result of exhaustive studies to solve the above-mentioned problems, the present inventors have found that a release film having, as a release layer, a resin layer containing a polyvinyl alcohol having a specific saponification rate, and this finding has led to the present invention.

That is, the gist of the present invention is as follows.

(1) A release film comprising substrate film and a resin layer provided on at least one surface of the substrate film, wherein the resin layer comprises 100 parts by mass of an acid-modified polyolefin resin, 1 to 20 parts by mass of a crosslinking agent and 10 to 1,000 parts by mass of a polyvinyl alcohol having a saponification rate of 99% or lower.

(2) The release film according to (1), wherein a saponification rate of the polyvinyl alcohol is 98% or lower.

(3) The release film according to (1) or (2), wherein an olefin component of the acid-modified polyolefin resin comprises ethylene and/or propylene.

(4) The release film according to any one of (1) to (3), wherein a content of propylene in an olefin component of the acid-modified polyolefin resin is 50% by mass or higher.

(5) The release film according to any one of (1) to (3), wherein a content of propylene in an olefin component of the acid-modified polyolefin resin is 95% by mass or higher.

(6) The release film according to any one of (1) to (5), wherein a peel force between the resin layer and an acrylic adherend as measured by pasting the acrylic adherend to the resin layer is 3.0 N/cm or lower.

(7) The release film according to any one of (1) to (6), wherein a resin constituting the substrate film is a polyester.

(8) A method for manufacturing a release film according to any one of (1) to (7), the method comprising drying and stretching a film comprising a substrate film and a resin layer-forming liquid material applied to the substrate film, wherein the resin layer-forming liquid material comprises 100 parts by mass of an acid-modified polyolefin resin, 1 to 20 parts by mass of a crosslinking agent and 10 to 1,000 parts by mass of a polyvinyl alcohol having a saponification rate of 99% or lower.

Advantageous Effects of Invention

The release film of the present invention is a release film better in coating film uniformity and high in quality, in which the releasability is excellent and the generation of fine nonplanar shapes of about several tens nm to several hundred nm in height can also be prevented, and in which even when the release film is stored for a long period in a high-humidity environment, warpage of film ends is suppressed. Further in the release film, there can be suppressed also peeling electrification generated when the release film is peeled in a low-humidity environment. Not only the release film of the present invention is excellent in releasability, but also the release film, since being able to improve the yield of products and stabilize the quality of the products when the release film is laminated on adherends to make laminated films as the products, can suitably be used as a protection film or the like.

DESCRIPTION OF EMBODIMENTS

Hereinafter, the present invention will be described in detail.

The release film of the present invention is a release film including a substrate film and a resin layer provided on at least one surface of the substrate film, wherein the resin layer contains an acid-modified polyolefin resin, a polyvinyl alcohol and a crosslinking agent.

As the substrate film constituting the release film of the present invention, there are used, for example, polyester films of polyethylene terephthalate (PET), polybutylene terephthalate (PBT), polyethylene naphthalate (PEN), poly (1,4-cyclohexylene dimethylene terephthalate), polylactic acid (PLA) or the like, polyolefin films of polypropylene or the like, polystyrene films, polyamide films of polyamide 6, poly-p-xylyleneadipamide (MXD6 nylon), polyamide 66, polyamide 46, polyamide 4T, polyamide 6T, polyamide 9T or the like, polycarbonate films, polyacrylonitrile films, polyimide films, and multilayer films thereof (for example, polyamide 6/MXD6 nylon/polyamide 6, polyamide 6/ethylene-vinyl alcohol copolymer/polyamide 6), and mixture films thereof; and polyester films and polyamide films having mechanical strength and dimensional stability are preferable.

The intrinsic viscosity of a resin constituting the substrate film is preferably 0.55 to 0.80 and more preferably 0.60 to 0.75. When the intrinsic viscosity is lower than the range, cutting is liable to occur in film formation; stable production of films is difficult; and also the strength of produced films is low. On the other hand, when the intrinsic viscosity is higher than the range, the shearing heat generation becomes large in melt extrusion of the resin in the film production process and the load on an extruder becomes high; the productivity of films reduces, which includes that the production speed is unavoidably sacrificed and control of the film thickness becomes difficult. Further in produced films, there increase thermally decomposed materials and gelated materials increase and there increase surface defects, foreign matter and surface coarse projections. Then the resin having too high an intrinsic viscosity also causes elongating the polymerization time and the polymerization process and raising the costs.

A method for polymerizing the resin constituting the substrate film is not especially limited, and for example, in the case of polyester, the method includes transesterification methods and direct polymerization methods. Transesterification catalysts include oxides of Mg, Mn, Zn, Ca, Li, Ti or the like and compounds such as acetate salts. Further, polycondensation catalysts include oxides of Sb, Ti, Ge or the like and compounds such as acetate salts.

Since the polyester after the polymerization contains monomers and oligomers, and acetaldehyde and the like as by-products, the polyester may be prepared by solid state polymerization under reduced pressure or in the circulation of an inert gas at a temperature of 200° C. or higher.

To the substrate film, as required, there can be added additives, for example, an antioxidant, a thermal stabilizer, an ultraviolet absorbent an antistatic additive, and a pinning agent. The antioxidant includes hindered phenolic compounds and hindered amine-based compounds; the thermal stabilizer includes phosphorus-based compounds; and the ultraviolet absorbent includes benzophenone-based compounds and benzotriazole-based compounds.

Then, one example of a method for manufacturing the substrate film will be described by using a polyester film as a specific example.

First, a fully dried polyester is fed to an extruder, melted at a temperature at which the polyester is sufficiently plasticized and exhibits flowability, or a higher temperature, passed through a filter selected according to needs, and thereafter extruded in a sheet form through a T die. The sheet is closely adhered on a cooling drum regulated at a temperature equal to or lower than the glass transition temperature (Tg) of the polyester to thereby obtain an unstretched film.

The obtained unstretched film is uniaxially oriented by a uniaxial stretching method, or biaxially oriented by a biaxial stretching method. The biaxial stretching method is not especially limited, but there can be used a successive biaxial stretching method or a simultaneous biaxial stretching method.

In the uniaxial stretching method, an unstretched film is stretched in the longitudinal direction or in the transverse direction at a temperature in the range of Tg of the resin to a temperature 50° C. higher than the Tg so as to make a stretch ratio of about 2 to 6 times.

In the simultaneous biaxial stretching method, an unstretched film is stretched in the longitudinal and transverse directions in the temperature range of Tg of the resin to a temperature 50° C. higher than the Tg so as to each make a stretch ratio of about 2 to 4 times. The unstretched film, before being introduced to a simultaneous biaxial stretching machine, may be subjected to a preliminary longitudinal stretching to about 1.2 times.

Then in the successive biaxial stretching method, an unstretched film is heated by a heating roll, infrared rays or the like and stretched in the longitudinal direction to thereby obtain a longitudinally stretched film. It is preferable that the longitudinal stretching is carried out by utilizing the difference in the peripheral speed between two or more rolls and at a temperature in the range of Tg of the polyester to a temperature 40° C. higher than the Tg so as to make a stretch ratio of 2.5 to 4.0 times. The longitudinally stretched film is then continuously subjected to transverse stretching in the transverse direction, heat set and heat relaxation sequentially to thereby make a biaxially oriented film. It is preferable that the transverse stretching is carried out at an initiation temperature in the range of Tg of the resin to a temperature 40° C. higher than the Tg and at a maximum temperature lower by (100 to 40)° C. than the melting point (Tm) of the resin. The magnification of the transverse stretching is regulated depending on required physical properties of a final film, but is preferably 3.5 or more times and further 3.8 or more times, and more preferably 4.0 or more times. After the stretching in the longitudinal direction and the transverse direction, by further carrying out longitudinal and/or transverse another stretching, the elastic modulus of the film can also be raised and the dimensional stability thereof can also be enhanced.

It is preferable that following the stretching, there are carried out heat set treatment at a temperature lower by (50 to 10)° C. than Tm of the resin for several seconds, and simultaneously with the heat set treatment, relaxation of 1 to 10% in the film transverse direction. The film, after the heat set treatment, is cooled to a temperature of Tg or lower to thereby obtain a biaxially stretched film.

A single-layer film is obtained by the above-mentioned manufacturing method, but the substrate film constituting the release film may be a multilayer film made by laminating two or more layers.

The multilayer film can be manufactured by a method in which in the above-mentioned manufacturing method, resins constituting each layer are separately melted and extruded through a multilayer die to be laminated and fused before solidification and thereafter, the resultant is subjected to biaxial stretching and heat set; a method in which in the above-mentioned manufacturing method, two or more resins are separately melted and extruded to make films, and the films are, in an unstretched state or after being stretched, laminated and fused; or the like. From simplicity of the process, preferable is use of a multilayer die and lamination and fusion before solidification.

The release film of the present invention has the substrate film and a resin layer on at least one surface of the substrate film, wherein the resin layer contains an acid-modified polyolefin resin, a polyvinyl alcohol and a crosslinking agent.

The acid-modified polyolefin resin contained in the resin layer is a resin having an olefin component as its main component and modified with a modifying acid component.

The olefin component constituting the acid-modified polyolefin resin contains preferably at least one selected from ethylene, propylene and butene, and from the viewpoint of releasability from epoxy prepregs, more preferably propylene. From the viewpoint of more improving the releasability from the epoxy prepregs, the content of propylene in the olefin component is preferably 50% by mass or higher, more preferably 80% by mass or higher, still more preferably 95% by mass or higher and especially preferably 99% by mass or higher.

The modifying acid component constituting the acid-modified polyolefin resin includes unsaturated carboxylate components, and examples thereof include acrylic acid, methacrylic acid, maleic acid, maleic anhydride, itaconic acid, itaconic anhydride, fumaric acid and crotonic acid, and additionally half esters and half amides of unsaturated dicarboxylic acids. Among these, in order to stably dispersing a resin in aqueous dispersing of the resin described later, preferable are acrylic acid, methacrylic acid, maleic acid and maleic anhydride, and especially preferable are acrylic acid, methacrylic acid and maleic anhydride. Two or more of these modifying acid components may be contained in the acid-modified polyolefin resin.

The proportion of the modifying acid component in the acid-modified polyolefin resin is preferably 1 to 10% by mass and more preferably 2 to 9% by mass. When the modifying acid component is lower than 1% by mass, since the proportion of polar groups in the acid-modified polyolefin resin contained in the resin layer becomes low, sufficient adhesiveness of the resin layer with the substrate film is likely to be incapable of being provided and an adherend released from the resin layer is contaminated in some cases. Further in aqueous dispersing of the resin described later, it is likely to become difficult to stably dispersing the resin. On the other hand, when the proportion of the modifying acid component is higher than 10% by mass, since the proportion of polar groups becomes high, the adhesiveness of the resin layer with the substrate film becomes sufficient; but since also the adhesiveness of the resin layer with an adherend simultaneously becomes high, the releasability from the adherend is likely to reduce.

Further in order to more improve the adhesiveness to the substrate film, the acid-modified polyolefin resin may contain an ethylenic unsaturated component having an oxygen atom in the side chain.

The ethylenic unsaturated component having an oxygen atom in the side chain includes esterified substances of (meth)acrylic acid with an alcohol having 1 to 30 carbon atoms; and among these, from the viewpoint of easy availability, preferable are esterified substances of (meth)acrylic acid with an alcohol having 1 to 20 carbon atoms. Specific examples of such compounds include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth)acrylate, dodecyl (meth)acrylate and stearyl (meth)acrylate. A mixture of these may be used. Among these, from the viewpoint of adhesion properties to the polyester film, more preferable are methyl (meth)acrylate, ethyl (meth)acrylate, butyl (meth)acrylate, hexyl acrylate and octyl acrylate; still more preferable are ethyl acrylate and butyl acrylate; and especially preferable is ethyl acrylate. The "(meth)acrylate" means an "acrylate or methacrylate".

The ethylenic unsaturated component having an oxygen atom in the side chain, similarly to the modifying acid component, has a polar group in its molecule. Hence, by incorporating the ethylenic unsaturated component having an oxygen atom in the side chain to the acid-modified polyolefin resin, the adhesiveness of the resin layer with the substrate film becomes high. When the amount of the ethylenic unsaturated component having an oxygen atom in the side chain is too large, however, the property of the resin originated from an olefin is lost and the releasability of the resin layer from an adherend may possibly reduce. The proportion of the ethylenic unsaturated component having an oxygen atom in the side chain in the acid-modified polyolefin resin is preferably 1 to 40% by mass, more preferably 2 to 35% by mass, still more preferably 3 to 30% by mass and especially preferably 6 to 18% by mass.

Then, even use of the acid-modified polyolefin resin containing the ethylenic unsaturated component having an oxygen atom in the side chain does not impair the adhesiveness to the substrate film and additionally the releasability the resin layer has.

The acid-modified polyolefin resin may be copolymerized with small amounts of other monomers. Examples of the other monomers include dienes, (meth)acrylonitrile, vinyl halides, vinilidene halides, carbon monoxide and sulfur dioxide.

The form of the each component constituting the acid-modified polyolefin resin suffices as long as the each component is copolymerized in the acid-modified polyolefin resin, and is not limited. Examples of the copolymerization state include random copolymerization, block copolymerization and graft copolymerization (graft-modified).

The melting point of the acid-modified polyolefin resin is preferably 80 to 200° C. and more preferably 90 to 150° C. When the melting point exceeds 200° C., in formation of the resin layer on the substrate film, a treatment at a high temperature is needed in some cases. On the other hand, when the melting point is lower than 80° C., the releasability of the resin layer reduces.

In the present invention, the resin layer needs to contain the acid-modified polyolefin resin and the polyvinyl alcohol as well. In the resin layer, by making the polyvinyl alcohol to be dispersed in the acid-modified polyolefin resin, the releasability due to the acid-modified polyolefin resin and the crosslinking agent can be improved.

In the present invention, the polyvinyl alcohol constituting the resin layer needs to have a saponification rate of 99% or lower; and the upper limit thereof is preferably lower than 98%, more preferably lower than 96% and still more preferably lower than 95%. By providing the resin layer in which the saponification rate of the polyvinyl alcohol is made to be 99% or lower, there can be prevented the generation, in the resin layer, of fine nonplanar shapes of about several tens nm to several hundred nm in height. By contrast, when the saponification rate of the polyvinyl alcohol exceeds 99%, the fine nonplanar shapes generated in the resin layer are likely to increase, and are transferred to an adherend, which leads to reduction in the quality of the adherend after releasing. Further when the release film is stored for a long period in a high-humidity environment, the film ends are likely to warp, and on the other hand, in a low-humidity environment, the release film is likely to cause peeling electrification.

Further in the present invention, from the viewpoint of stability of the liquid material for forming the resin layer, the lower limit of the saponification rate of the polyvinyl alcohol is preferably 80% or higher, more preferably 85% or higher and still more preferably 90% or higher. When the saponification rate of the polyvinyl alcohol is lower than 80%, the stability of the liquid material for forming the resin layer reduces and the productivity reduces.

By using the polyvinyl alcohol having a saponification rate in the above-mentioned range, the warpage of film ends when the release film is stored in a high-humidity environment can be suppressed; and when the release film is used as a release film in a low-humidity environment, the peeling electrification can be suppressed.

The content of the polyvinyl alcohol needs to be, with respect to 100 parts by mass of the acid-modified polyolefin resin, 10 to 1,000 parts by mass, and is preferably 100 to 1,000 parts by mass, more preferably 210 to 800 parts by mass and still more preferably 300 to 600 parts by mass. When the content of the polyvinyl alcohol exceeds 1,000 parts by mass, in the liquid material for forming the resin layer, the viscosity becomes high; the above-mentioned fine nonplanar shapes are liable to be generated on the coating film and fine nonplanar shapes are liable to be generated on the formed resin layer; and the resin layer becomes liable to move to an adherend. By contrast, when the content of the polyvinyl alcohol is lower than 10 parts by mass, the effect of addition thereof to the resin layer vanishes.

As described later, in the present invention, since it is preferable that a liquid medium constituting the resin layer-forming liquid material is an aqueous medium, it is preferable that the polyvinyl alcohol is water-soluble because of being easily mixed.

In the present invention, as the polyvinyl alcohol, commercially available products can be used and there can be used, for example, "J-Poval" series, "JP-15", "JT-05", "JL-05E", "JM-33", "JM-17", "JF-05" and "JF-10", manufactured by Japan VAM a Poval Co., Ltd., and "Kuraray Poval" series, "PVA-CST", "PVA-624", "PVA-203", PVA-220" and "PVA-405", manufactured by Kuraray Co., Ltd.

In the present invention, the resin layer needs to contain the acid-modified polyolefin resin and the polyvinyl alcohol and together the crosslinking agent. By incorporating the crosslinking agent, components constituting the resin layer are crosslinked to improve the releasability and the resin layer is improved in the cohesive force, whereby the resin layer can be made to be hardly moved to an adherend and the water resistance can be improved.

The content of the crosslinking agent needs to be, with respect to 100 parts by mass of the acid-modified polyolefin resin, 1 to 20 parts by mass, and is preferably 2 to 15 parts by mass and more preferably 2 to 10 parts by mass. When the content of the crosslinking agent is lower than 1 part by mass, the resin layer becomes weak in the cohesive force, and is inferior in the adhesiveness to the substrate film and likely to easily move to an adherend. By contrast, when the content exceeds 20 parts by mass, the resin layer reacts with an adherend to make the releasability poor and to make the viscosity of the liquid material for forming the resin layer to be high and the stability to be reduced in some cases.

As the crosslinking agent, there can be used, for example, compounds having a plurality of functional groups reactive with a carboxyl group in their molecule, and the crosslinking agent includes polyfunctional epoxy compounds; polyfunctional isocyanate compounds; polyfunctional aziridine compounds; carbodiimide group-containing compounds; oxazoline group-containing compounds; phenol resins; and amino resins such as urea compounds, melamine resins and benzoguanamine resins. These may be used singly or concurrently in two or more. Among these, preferable are polyfunctional isocyanate compounds, melamine compounds, urea compounds, polyfunctional epoxy compounds, carbodiimide group containing compounds, oxazoline group-containing compounds and the like; more preferable are carbodiimide group-containing compounds and oxazoline group-containing compounds; and still more preferable are oxazoline group-containing compounds. Use of an oxazoline group-containing compound enables the release film excellent in releasability from an adherend and adhesiveness to the substrate to be obtained. Further these crosslinking agents can be used in a combination thereof.

As the polyfunctional epoxy compounds, there can be used, specifically, polyepoxy compounds, diepoxy compounds and the like. As the polyepoxy compounds, there can be used, for example, sorbitol polyglycidyl ether, polyglycerol polyglycidyl ether, pentaerythritol polyglycidyl ether, diglycerol polyglycidyl ether, triglycidyltris(2-hydroxyethyl) isocyanate, glycerol polyglycidyl ether and trimethylolpropane polyglycidyl ether. As the diepoxy compounds, there can be used, for example, neopentyl glycol diglycidyl ether, 1,6-hexanediol diglycidyl ether, resorcinol diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether.

As the polyfunctional isocyanate compounds, there can be used, for example, tolylene diisocyanate, diphenylmethane-4,4'-diisocyanate, metaxylylene diisocyanate, hexamethylene-1,6-diisocyanate, 1,6-diisocyanatohexane, adducts of tolylene diisocyanate with hexanetriol, adducts of tolylene diisocyanate with trimethylolpropane, polyol-modified diphenylmethane-4,4'-diisocyanate, carbodiimide-modified diphenylmethane-4,4'-diisocyanate, isophorone diisocyanate, 1,5-naphthalene diisocyanate, 3,3'-bitolylene-4,4'-diisocyanate, 3,3'-dimethyldiphenylmethane-4,4'-diisocyanate and metaphenylene diisocyanate. There may also be used blocked isocyanate compounds obtained by blocking these isocyanate groups with a bisulfite, a phenol containing a sulfonate group, an alcohol, a lactam, an oxime, an active methylene compound or the like.

Examples of commercially available products of the polyfunctional isocyanate compounds include "Basonate HW-100", manufactured by BASF AG.

As the polyfunctional aziridine compounds, there can be used, for example, N,N'-hexamethylene-1,6-bis(1-aziridinecarboxyamide) and trimethylolpropane-tri-β-aziridinyl propionate.

The carbodiimide group-containing compounds are not especially limited as long as having one or more carbodiimide groups in their molecule. The carbodiimide compound forms esters with two carboxyl groups in an acid-modified moiety of the acid-modified polyolefin resin in one carbodiimide moiety to attain crosslinking. There can be used, for example, compounds having a carbodiimide group, such as p-phenylene-bis(2,6-xylylcarobodiimide), tetramethylene-bis(t-butylcarbodiimide) and cyclohexane-1,4-bis(methylene-t-butylcarbodiimide), and polycarbodiimides, which are polymers having a carbodiimide group. These may be used singly or concurrently in two or more. Among these, polycarbdiimides are preferable from the viewpoint of easy handleability.

Commercially available products of the polycarbdiimides include Carbodilite series, manufactured by Nisshinbo Chemical Inc, and specifically include "SV-02", "V-02", "V-02-L2" and "V-04", which are of water-soluble type; "E-01" and "E-02", which are of emulsion type; "V-01", "V-03", "V-07" and "V-09", which are of organic solution type; and "V-05", which is of solventless type.

The oxazoline group-containing compounds are not especially limited as long as having two or more oxazoline groups in their molecule. The oxazoline compound forms an amidoester with one carboxyl group in an acid-modified moiety of the acid-modified polyolefin resin in each of two oxazoline moieties to attain crosslinking. Such polymers can be fabricated by polymerization of an addition-polymerizable oxazoline group-containing monomer singly or with other monomers. The addition-polymerizable oxazoline group-containing monomer includes 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. The addition-polymerizable oxazoline group-containing monomers can be used singly or as a mixture of two or more. Among these, 2-isopropenyl-2-oxazoline is easily available industrially and then preferable. The other monomers are not especially limited as long as being monomers copolymerizable with the addition-polymerisable oxazoline group-containing monomer; and examples thereof include (meth) acrylate esters such as alkyl acrylates and alkyl methacrylate (the alkyl group includes a methyl group, an ethyl group, an n-propyl group, an isopropyl group, an n-butyl group, an isobutyl group, a t-butyl group, a 2-ethylhexyl group and a cyclohexyl group); unsaturated carboxylic acids such as acrylic acid, methacrylic acid, itaconic acid, maleic acid, fumaric acid, crotonic acid, styrenesulfonic acid and salts thereof (sodium salts, potassium salts, ammonium salts, tertiary amine salts and the like); unsaturated nitriles such as acrylonitrile and methacrylonitrile; unsaturated amides such as acrylamide, methacrylamide, N-alkylacrylamides, N-alkylmethacrylamides, N,N-dialkylacrylamides, N,N-dialkylmethacrylamides (the alkyl group includes a methyl group, an ethyl group, an n-propyl group, an isopropyl group, an n-butyl group, an isobutyl group, a t-butyl group, a 2-ethylhexyl group and a cyclohexyl group); vinyl esters such as vinyl acetate and vinyl propionate; vinyl ethers such as methyl vinyl ether and ethyl vinyl ether; α-olefins such as ethylene and propylene; halogen-containing α,β-unsaturated aliphatic monomers such as vinyl chloride, vinylidene chloride and vinyl fluoride; and α,β-unsaturated aromatic monomers such as styrene and α-methylstyrene. These other monomers can be used singly or concurrently in two or more. Among these, oxazoline group-containing polymers are preferable because of easy handleability.

Commercially available products of the oxazoline group-containing polymers include Epocros series, manufactured by Nippon Shokubai Co., Ltd., and specifically include "WS-500" and "WS-700", which are of water-soluble type; and "K-1010E", "K-1020E", "K-1030E", "K-2010E", "K-2020E" and "K-2030E", which are of emulsion type.

As the phenol resins, there can be used, for example resol-type phenol resins and/or novolac-type phenol resins prepared by using, as a raw material, an alkylphenol such as phenol, bisphenol A, p-t-butylphenol, octylphenol or p-cumylphenol, p-phenylphenol, cresol or the like.

As the urea resins, there can be used, for example, dimethylol urea, dimethylol ethylene urea, dimethylol propylene urea, tetramethylol acetylene urea, 4-methoxy5-dimethylpropylene urea dimethylol.

The melamine resins are compounds having, as functional groups, for example, an imino group, a methylol group and/or an alkoxymethyl group (for example, a methoxymethyl group or a butoxymethyl group) in one molecule thereof. As the melamine resins, there can be used imino group-type methylated melamine resins, methylol group-type melamine resins, methylol group-type methylated melamine resins, fully alkyl-type methylated melamine resins and the like. Among these, methylolated melamine resins are most preferable. Further in order to promote heat curing of melamine-based resins, it is preferable to use an acidic catalyst, such as p-toluenesulfonic acid.

As the benzoguanamine resins, there can be used, for example, trimethylol benzoguanamine, hexamethylol benzoquanamine, trismethoxymethyl benzoguanamine and hexakismethoxymethyl benzoguanamine.

In the present invention, the resin layer may contain a lubricant in the range of not impairing the advantageous effect of the present invention. Examples of the lubricant include inorganic particles of calcium carbonate, magnesium carbonate, calcium oxide, zinc oxide, magnesium oxide, silicon oxide, soda silicate, aluminum hydroxide, iron oxide, zirconium oxide, barium sulfate, titanium oxide, tin oxide, antimony trioxide, carbon black, molybdenum disulfide or the like, organic particles of acrylic crosslinked polymers, styrenic crosslinked polymers, silicone resins, fluororesins, benzoguanamine resins, phenol resins, nylon resins, polyethylene waxes or the like, and surfactants.

The resin layer constituting the release film of the present invention is suppressed in the generation of fine nonplanar shapes of about several tens nm to several hundred nm in height, and is excellent in appearance. In detail, an average value can be made to be 1.0 place/m or lower, the average value being an average value of presence rates of continuous streaky, discrete or otherwise fine nonplanar shapes per 1 m of film width of a film, acquired by observing the film full width at 10 points in total on the film consisting of one point that is 1 m from one end edge in the longitudinal direction of the film, one point that is 1 m from the other end edge and 8 points indicated by dividing the portion of the film between the two points into 9 equal parts. Such fine nonplanar shapes can be visually confirmed by light interference under a high-luminance light source (300 lm or higher). Here, the confirmation is difficult under a low-luminance light source such as a fluorescent lamp.

By using the release film of the present invention, the peel force between the resin layer and an acrylic adherend as a pressure-sensitive adhesive material as measured by pasting the acrylic adherend to the resin layer can be made to be 3.0 N/cm or lower, preferably 2.8 N/cm or lower and more preferably 2.6 N/cm or lower. The peel force exceeding 3.0 N/cm corresponds to heavy peel, which becomes difficult to practically use as the release film.

Then, use of the release film of the present invention provides excellent releasability when an epoxy prepreg is measured by being pasted to the resin layer. Practically, the peel force between the resin layer and the epoxy prepreg is required to be made to be 0.2 N/cm or lower; and in the release film of the present invention, the peel force can be made to be 0.2 N/cm or lower, and preferably 0.01 to 0.1 N/cm and more preferably 0.01 to 0.05 N/cm. When the peel force exceeds 0.2 N/cm, peeling from the epoxy prepreg becomes difficult and the handleability reduces.

In the present invention, the thickness of the resin layer is preferably 0.01 to 1 μm, more preferably 0.03 to 0.7 μm and still more preferably 0.05 to 0.5 μm. When the thickness of the resin layer is smaller than 0.01 μm, sufficient releasability is not attained; and when exceeding 1 μm, since the resin layer becomes liable to move to the adherend and the cost rises, the case is not preferable.

In the release film of the present invention, the generation of warpage after being allowed to stand still under the condition of 25° C. and 80% for 7 days can be made to be 2.0 mm or smaller, preferably 1.0 mm or smaller and more preferably 0.5 mm or smaller. When the warpage exceeds 2.0 mm, in use thereof as a release film, it becomes difficult for the release film to be adhered closely on an adherend and the handleability reduces.

Methods for manufacturing the release film of the present invention include a method in which a resin layer-forming liquid material containing 100 parts by mass of the acid-modified polyolefin resin, 1 to 20 parts by mass of the crosslinking agent and 10 to 1,000 parts by mass of the polyvinyl alcohol having a saponification rate of 99% or lower in a liquid medium is applied on at least one surface of an unstretched or uniaxially stretched film, and thereafter, the film having a coating film formed thereon is subjected to drying, stretching and a heat treatment.

In the present invention, it is preferable that the liquid medium constituting the resin layer-forming liquid material is an aqueous medium. The aqueous medium means a solvent in which water and an amphipathic organic solvent are contained and the content of the water is 2% by mass or higher, and may be water alone.

The amphipathic organic solvent refers to an organic solvent having a solubility at 20° C. of water to the organic solvent of 5% by mass or higher (about the solubility of water to organic solvents at 20° C., there are descriptions in literatures, for example, "Solvent Handbook" (Kodansha Scientific Ltd., 1990, 10th version).

Specific examples of the amphipathic organic solvent include alcohols such as methanol, ethanol, n-propanol and isopropanol, ethers such as tetrahydrofuran and 1,4-dioxane, ketones such as acetone and methyl ethyl ketone, esters such as methyl acetate, n-propyl acetate, isopropyl acetate, methyl propionate, ethyl propionate and dimethyl carbonate, ethylene glycol derivatives such as ethylene glycol n-butyl ether, organic amine compounds, including ammonia, such as diethylamine, trimethylamine, diethanolamine, triethanolamine, N,N-dimethylethanolamine and N,N-diethylethanolamine, and lactams such as 2-pyrrolidone and N-methyl-2-pyrrolidone.

The resin layer-forming liquid material can be prepared, though not limited to the following method, by adding the polyvinyl alcohol and the crosslinking agent to a liquid material of the acid-modified polyolefin resin.

As the liquid material of the acid-modified polyolefin resin, an aqueous dispersion of the acid-modified polyolefin resin can be used. A method for aqueously dispersing the acid-modified polyolefin resin is not especially limited, but includes, for example, a method described in International Publication No. WO02/055598.

The dispersed particle diameter of the acid-modified polyolefin resin in the aqueous medium is, from the viewpoint of stability in mixing with other components and storage stability after the mixing, in terms of number-average particle diameter, preferably 1 μm or smaller and more preferably 0.8 μm or smaller. Such a particle diameter can be attained by a manufacturing method described in International Publication No. WO02/055598. Here, the number-average particle diameter of the acid-modified polyolefin resin can be measured by a dynamic light scattering method.

The solid content concentration of the aqueous dispersion of the acid-modified polyolefin resin is not especially limited, but is, in order to suitably hold the viscosity of the aqueous dispersion, preferably 1 to 60% by mass and more preferably 5 to 30% by mass.

The solid content concentration of the resin layer-forming liquid material obtained by mixing the aqueous dispersion of the acid-modified polyolefin resin, the polyvinyl alcohol and the crosslinking agent can suitably be selected according to the lamination condition, the target thickness, the target performance and the like, and is not especially limited. In order to suitably hold the viscosity of the liquid material and to form a uniform resin layer, however, the concentration is preferably 2 to 30% by mass and more preferably 3 to 20% by mass.

To the resin layer-forming liquid material, there can also be added an antioxiadant, an ultraviolet absorbent, a lubricant, a colorant and the like in the range of not impairing the performance.

In the present invention, methods for applying the resin layer-forming liquid material on the polyester film include well-known methods, for example, gravure roll coating, reverse roll coating, wire bar coating, lip coating, air knife coating, curtain flow coating, spray coating, dip coating and brushing; and the resin layer-forming liquid material is effective especially in the case of being applied by gravure roll coating, because the generation of above-mentioned fine nonplanar shapes on the coating film can be suppressed.

The method for manufacturing the release film according to the present invention includes drying and stretching a film in which the resin layer-forming liquid material is applied on the substrate film. It is preferable that the method further includes heat set treatment.

The drying and stretching the film in which the resin layer-forming liquid material has been applied (inline system), since being able to form the resin layer in such a state that the degree of oriented crystallization of the substrate film surface is low as compared with an offline system in which the resin layer-forming liquid material is applied and dried on the substrate film, improves the adhesion strength between the substrate film and the resin layer. Further since the resin layer can be subjected to a heat treatment at a higher temperature in such a state that the film is tensed, the releasability and the residual adhesion rate can be improved without reducing the quality of the release film.

By adopting the successive biaxial stretching method, the liquid material is applied on the substrate film stretched in a uniaxial direction, and the film in which the liquid material has been applied is dried and further subjected to stretching in the direction orthogonal to the uniaxial direction and a heat treatment, which is preferable for the reason of simplicity and operation.

The release film of the present invention can suitably be used for protection films of double-sided tapes and pressure-sensitive adhesive materials, for protection materials and process materials in manufacturing components for liquid crystal displays, printed wiring board and the like, and for applications to molding sheet-form structural bodies such as ion-exchange membranes, ceramic green sheets and heat-dissipating sheets.

EXAMPLES

Hereinafter, the present invention will be described by way of Examples, but the present invention is not limited thereto. The characteristics of the release film were measured by the following methods.
(1) Saponification Rate of the Polyvinyl Alcohol
The saponification rate of the polyvinyl alcohol was measured according to JIS K6726.

(2) Stability of the Resin Layer-Forming Liquid Material

The solution viscosity (mPa·s) was measured by using a B-type viscometer (manufactured by Tokyo Keiki Inc., DVL-BII type digital viscometer) under the condition of a temperature of 25° C. and a rotation frequency of 60 rpm. The viscosity of the resin layer-forming liquid material before initiation of application was taken as H0; and the viscosity thereof after an elapse of 5 hours from the application initiation, as H1. The stability of the resin layer-forming liquid material was evaluated based on the following criteria from the acquired viscosities H0 and H1.

Good: $0.9 \leq H1/H0 < 1.1$
Fair: $0.7 \leq H1/H0 < 0.9$, $1.1 \leq H1/H0 < 1.3$
Fail: $H1/H0 < 0.7$, $1.3 \leq H1/H0$ (3) Fine Nonplanar Shapes of the Resin Layer Surface Release films obtained in Examples and Comparative Examples were evaluated by the following two methods.

In either method thereof, evaluation points used were 10 points in total on the film consisting of one point that is 1 m from one end edge in the longitudinal direction of the film, one point that is 1 m from the other end edge and 8 points indicated by dividing the portion of the film between the two points into 9 equal parts; and a straight line was drawn in the transverse direction (TD) of the film at each point using a black oily pen and the presence/absence of continuous streaky and discrete fine nonplanar shapes of about several tens nm to several hundred nm in height crossing the straight line was observed for the film full width.

(Evaluation Method A)

White light rays (100 lm) of a fluorescent lamp 30 cm apart from the film were directed at an angle of 5 to 45° to the resin layer-side surface of the release film, and the presence/absence of places indicating light interference corresponding to the presence of the continuous streaky and discrete fine nonplanar shapes was visually confirmed. The case where in the film full width at the 10 points, at any points, continuous streaky and discrete fine nonplanar shapes of about several tens nm to several hundred nm in height were not confirmed at all was taken as "absent"; and the case where at one or more points, the nonplanar shapes were confirmed was taken as "present".

(Evaluation Method B)

Light rays of a high-luminance LED flash lamp (manufactured by Ledlenser Co., M7R type, 400 lm) 30 cm apart from the film were directed at an angle of 10 to 45° to the resin layer-side surface of the release film, and the presence/absence of places indicating light interference corresponding to the presence of the continuous streaky and discrete fine nonplanar shapes of about several tens nm to several hundred nm in height was visually confirmed and counted. Then, the number as the defective places of the fine nonplanar shapes per 1 m of the film widths were calculated and an average value thereof was determined.

(4) Adhesiveness Between the Substrate Film and the Resin Layer

The adhesion properties of the resin layer-side surface of the obtained release film were confirmed by a cross-cut method according to JIS K5600-5-6. In detail, pressure-sensitive adhesive tape (manufactured by Nichiban Co., Ltd., TF-12) was pasted on the resin layer surface on which a grid pattern having 100 squares made by incising had been formed, and was vigorously peeled off. Here, "100/100" indicated that the 100 squares exhibited no peeling-off at all, which was in the best condition; and "0/100" indicated that all of the 100 squares were peeled off, which was in the worst condition. 100/100 to 90/100 was taken as acceptable; and 100/100 to 95/100, particularly 100/100 to 98/100 indicated being excellent, and 100/100 indicated being best.

(5) Releasability from the Acrylic Pressure-Sensitive Adhesive Agent

An acrylic pressure-sensitive adhesive tape (manufactured by Nitto Denko Corp., No. 31B/acrylic pressure-sensitive adhesive agent) of 50 mm in width and 150 mm in length was pressure-bonded to the resin layer side of the obtained release film by a rubber roll to thereby make a sample. The sample was sandwiched in the form of a metal plate/a rubber plate/the sample/a rubber plate/a metal plate, and left to stand under a load of 2 kPa in an environment of 70° C. for 20 hours, and thereafter, cooled for 30 min or longer and returned to room temperature to thereby obtain a sample for measuring the peel strength.

The peel force between the acrylic pressure-sensitive adhesive tape and the release film of the sample for measuring the peel strength was measured under the condition of a peel angle of 180° and a peel speed of 300 mm/min by a tensile tester (manufactured by Shimadzu Corp., Autograph AGS-100B) in a thermostatic chamber at 23° C.

(6) Residual Adhesion Rate

The acrylic pressure-sensitive adhesive tape (manufactured by Nitto Denko Corp., No. 31B/acrylic pressure-sensitive adhesive agent), of 50 mm in width and 150 mm in length, peeled off the release film surface by (5) the test of the releasability from the acrylic pressure-sensitive adhesive agent was pasted on a corona-treated surface of a biaxially stretched polyester resin film (manufactured by Unitika Ltd., Emblet PET-12, thickness: 12 μm), and was left to stand under a load of 2 kPa and at room temperature for 20 hours. Thereafter, the peel force between the acrylic pressure-sensitive adhesive tape and the biaxially stretched polyester resin film was measured by a tensile tester (manufactured by Shimadzu Corp., Autograph AGS-100B) in a thermostatic chamber at 23° C. The peel angle was set at 180° and the peel speed was set at 300 mm/min. The peel force acquired by this measurement was taken as F1.

Separately, an unused acrylic pressure-sensitive adhesive tape (manufactured by Nitto Denko Corp., No. 31B/acrylic pressure-sensitive adhesive agent) of 50 mm in width and 150 mm in length was pasted on a corona-treated surface of a biaxially stretched polyester resin film (manufactured by Unitika Ltd., Emblet PET-38, thickness: 38 μm), and was left to stand under a load of 2 kPa and at room temperature for 20 hours. Thereafter, the peel force between the acrylic pressure-sensitive adhesive tape and the biaxially stretched polyester resin film was measured (the peel angle was 180° and the peel speed was 300 mm/min) by a tensile tester (manufactured by Shimadzu Corp., Autograph AGS-100B) in a thermostatic chamber at 23° C.; and the peel force acquired by this measurement was taken as F2.

The residual adhesion rate was acquired by using the following expression from the acquired peel forces F1 and F2.

$$\text{Residual adhesion rate (\%)} = (F1/F2) \times 100$$

(7) Releasability from an Epoxy Prepreg

Both surfaces of an epoxy prepreg (manufactured by Sumitomo Bakelite Co., Ltd., EI-6765) of 60 mm×100 mm in size were sandwiched between the resin layer-sides of the obtained release films, and in a vacuum pressing machine of 1.07 kPa (8 Torr), was heated from 30° C. to 150° C. at 15° C./min and held at 150° C. for 22 min, further heated to 190° C. at 5° C./min, pressed at a pressure of 5 kg/cm² for 10 min, and held at 190° C. for 70 min under a pressure of 15 kg/cm², and thereafter cooled to room temperature to thereby obtain a sample.

The peel force between the cured epoxy prepreg and the release films of the obtained sample was measured by a tensile tester (manufactured by Shimadzu Corp., Autograph AGS-100B) in a thermostatic chamber at 23° C. The peel angle was set at 180° and the peel speed was set at 300 mm/min.

(8) Warpage of the Release Film

The release film after being left to stand at 25° C. in a high-humidity environment of 80% RH for 7 days from right after the fabrication was cut out into 30 mm×150 mm, and mounted on a charge-neutralized plate, and the height (mm) of lifting of the ends of the short sides of the cut-out release film from the plate surface was measured for evaluation of warpage. Practically, the release film exhibiting a height of warpage of lower than 1 mm is demanded and in consideration of processability, it is preferable that the height of warpage is lower.

(9) Peeling Electrification 10 sheets of the release films were stacked at 25° C. in a low-humidity environment of 10% RH, and the generation of static electricity when the uppermost film was vigorously separated in a darkroom was evaluated according to the following criteria.

Absent: no generation of electrostatic light and electrostatic sounds was confirmed.

Present: generation of electrostatic light and electrostatic sounds was confirmed.

In order to prepare resin layer-forming liquid materials, acid-modified polyolefin resins and aqueous dispersions thereof were manufactured by the following methods.

<Manufacturing of an Acid-Modified Polyolefin Resin A-1>

280 g of a propylene-butene-ethylene ternary copolymer (propylene/butene/ethylene=68.0/16.0/16.0 (mass ratio)) was heated and melted in a four-necked flask in a nitrogen atmosphere; the temperature in the system was held at 170° C., and under stirring, 32.0 g of maleic anhydride as an unsaturated carboxylic acid and 6.0 g of dicumyl peroxide as radical generator were each added over 1 hour; thereafter, the resultant was allowed to react for 1 hour. After the finish of the reaction, the obtained reaction product was placed in a large amount of acetone to thereby deposit a resin. The resin was several times washed with acetone to remove unreacted maleic anhydride, and dried under reduced pressure in a vacuum drier to thereby obtain an acid-modified polyolefin resin A-1.

<Manufacturing of Acid-Modified Polyolefin Resins A-2 and A-3>

An acid-modified polyolefin resin A-2 was similarly obtained, except for altering the propylene-butene-ethylene ternary copolymer (propylene/butene/ethylene=68.0/16.0/16.0 (mass ratio)) to a propylene-ethylene copolymer (propylene/ethylene=99/1 (mass ratio)) in manufacturing the acid-modified polyolefin resin A-1.

Further, an acid-modified polyolefin resin A-3 was similarly obtained, except for altering to an ethylene-ethyl acrylate copolymer (ethylene/ethyl acrylate=93/7 (mass ratio)).

<Manufacturing of an Aqueous Dispersion of the Acid-Modified Polyolefin Resin A-1>

60.0 g of the acid-modified polyolefin resin A-1 manufactured by the above-mentioned method, 45.0 g of ethylene glycol n-butyl ether (boiling point: 171° C.), 6.9 g of N,N-dimethylethanolamine (boiling point: 134° C., in an equivalent 1.0 time the equivalent of carboxyl groups of the maleic anhydride unit in the resin) and 188.1 g of distilled water were placed in a hermetically sealable pressure-resistive 1 L-volume glass vessel having a heater and equipped with a stirrer, and stirred at a rotation frequency of a stirring blade of the stirrer of 300 rpm. After doing so, no precipitation of any resin was recognized in the vessel bottom and it was confirmed that the resin was in a suspended state. Then, while the resultant was held in this state, by energizing the heater after 10 min, the resultant was heated. The resultant was stirred further for 60 min while the temperature in the system was held at 140° C. Thereafter, the resultant was cooled by air cooling to room temperature (about 25° C.) under stirring at the rotation frequency held at 300 rpm. The resultant was further subjected to a pressure filtration (air pressure: 0.2 MPa) using a 300-mesh stainless steel-made filter (wire diameter; 0.035 mm, plain weave) to thereby obtain a homogeneous aqueous dispersion (solid content concentration: 25% by mass) of the acid-modified polyolefin resin A-1. Here, there was almost no remaining resin on the filter.

<Manufacturing of Aqueous Dispersions of the Acid-Modified Polyolefin Resins A-2 and A-3>

Aqueous dispersions (solid content concentration: 25% by mass) of the acid-modified polyolefin resins A-2 and A-3 were obtained by the same method as the above-mentioned method, except for altering the acid-modified polyolefin resin to be used to A-2 and A-3.

In order to prepare the resin layer-forming liquid materials, the polyvinyl alcohols to be used were the following aqueous solutions.

JL-05E: JL-05E, manufactured by Japan VAM & Poval Co., Ltd., saponification rate: 82.0%, degree of polymerization: 500, solid content concentration: 8% by mass JP-15: JP-15, manufactured by Japan VAM & Poval Co., Ltd., saponification rate: 88.0%, degree of polymerization: 1,500, solid content concentration: 8% mass JT-05: JT-05, manufactured by Japan VAM & Poval Co., Ltd., saponification rate: 94.5%, degree of polymerization: 500, solid content concentration: 8% by mass JM-17: JM-17, manufactured by Japan VAM & Poval Co., Ltd., saponification rate: 95.0%, degree of polymerization: 1,700, solid content concentration: 8% by mass JF-05: JF-05, manufactured by Japan VAM & Poval Co., Ltd., saponification rate: 98.5%, degree of polymerization: 500, solid content concentration: 8% by mass JF-10: JF-10, manufactured by Japan VAM & Poval Co., Ltd., saponification rate: 98.5%, degree of polymerization: 1,000, solid content concentration: 8% by mass VC-10; VC-10, manufactured by Japan VAM & Poval Co., Ltd., saponification rate: 99.4%, degree of polymerization: 1,000, solid content concentration: 8% by mass The crosslinking agents to be used were the following.

WS-700; Epocros WS-700, manufactured by Nippon Shokubai Co., Ltd., an aqueous solution of an oxazoline group-containing compound, solid content concentration: 25% by mass V-02-L2: Carbodilite V-02-L2, manufactured by Nisshinbo Chemical Inc., an aqueous solution of a carbodiimide group-containing compound, solid content concentration: 25% by mass HW-100; HW-100, manufactured by BASF AG, an aqueous solution of a polyfunctional isocyanate compound, solid content concentration: 25% by mass

Example 1

<Preparation of a Resin Layer-Forming Liquid Material>

The acid-modified polyolefin resin aqueous dispersion "A-1", the polyvinyl alcohol aqueous solution "JP-15" and the aqueous solution of an oxazoline group-containing compound "WS-700" as the crosslinking agent were mixed so that the respective solid contents became 100 parts by mass, 300 parts by mass and 7 parts by mass, and adjusted by using water so that the final solid content concentration became 6.0% by mass, to thereby obtain a resin layer-forming liquid material.

<Manufacturing of a Release Film>

A polyethylene terephthalate (PET, polymerization catalyst: antimony trioxide, intrinsic viscosity: 0.62, glass transition temperature: 78° C., melting point: 255° C.) containing 0.08% by mass of amorphous silica particles of 2.3 μm in average particle diameter was melt extruded at 280° C., and adhesively quenched on a casting drum in a T-die method-electrostatic pinning system to thereby form an unstretched film of 600 μm in thickness. Then, the unstretched film was stretched to 3.5 times by a longitudinal stretching roll heated at 90° C.

The above-mentioned liquid material was applied on one surface of the longitudinally stretched film by using a reverse gravure coater so as to make a coating amount of 5 g/m² (in terms of wet); and the resultant was stretched to 4.5 times at 120° C. by a transverse stretching tenter, and thereafter subjected to a heat treatment at 230° C. for 10 sec, and thereafter cooled and taken up. The thickness of the obtained release film was 38 μm, and the thickness of the resin layer was about 0.08 μm.

Examples 2 to 16 and 20, and Comparative Examples 1 to 7

Release films were obtained as in Example 1, except for preparing resin layer-forming liquid materials so as to have constitutions described in Table 1, and using these liquid materials.

Example 17

An unstretched film was obtained as in Example 1, and the unstretched film was stretched to 3.5 times by a roll-type longitudinal stretching machine under the condition of 85° C. to thereby obtain a stretched film. Without application of any resin layer-forming liquid material to this stretched film, ends of the film were held in grips of a flat-type stretching machine, transversely stretched to 4.5 times under the condition of 100° C., and thereafter subjected to a heat treatment at 230° C. for 3 sec in which the relaxation rate in the transverse direction was made to be 3%, to thereby obtain a polyethylene terephthalate film of 38 μm in thickness.

A resin layer-forming liquid material having a constitution in Table 1 was applied by using a Meyer bar on the surface of the obtained polyethylene terephthalate film, and thereafter dried at 120° C. for 30 sec. Thereafter, the resultant was subjected to aging at 50° C. for 2 days to thereby obtain a release film in which a resin layer of 0.3 μm in thickness was provided on one surface of the polyester film of 38 μm in thickness.

Example 18

A polybutylene terephthalate (PBT, polymerization catalyst: antimony trioxide, intrinsic viscosity: 1.08, glass transition temperature: 55° C., melting point: 233° C.) containing 0.08% by mass of amorphous silica particles of 2.3 μm in average particle diameter was melt extruded at 270° C., and adhesively quenched on a casting drum in a T-die method-electrostatic pinning system to thereby form an unstretched film of 600 μm in thickness. Then, the unstretched film was stretched to 3.5 times by a longitudinal stretching roll heated at 60° C.

The above-mentioned liquid material was applied on one surface of the longitudinally stretched film by using a reverse gravure coater so as to make a coating amount of 5 g/m² (in terms of wet); and the resultant was stretched to 4.5 times at 80° C. by a transverse stretching tenter, and thereafter subjected to a heat treatment at 210° C. for 10 sec, and thereafter cooled and taken up. The thickness of the obtained release film was 38 μm, and the thickness of the resin layer was about 0.08 μm.

Example 19

A nylon 6 (Ny, relative viscosity: 3.03) containing 0.08% by mass of amorphous silica particles of 2.3 μm in average particle diameter was melt extruded at 260° C., and adhesively quenched on a casting drum in a T-die method-electrostatic pinning system to thereby form an unstretched film of 600 μm in thickness.

Then, the unstretched film was dipped in water at a temperature of 53° C. for 1 min, and thereafter dipped in water at a temperature of 80° C. for 20 sec. The above-mentioned liquid material was applied on one surface of the unstretched film having been subjected to the dipping treatments by using a reverse gravure coater so as to make a coating amount of 10 g/m² (in terms of wet), and dried. Then, the unstretched film having absorbed water was introduced to a simultaneous biaxial stretching machine, and subjected to simultaneous biaxial stretching of magnifications of longitudinally 3.3 times and transversely 3.0 times. Then, the resultant was subjected to a heat treatment at 210° C. to be subjected to a relaxation treatment of 5% in the transverse direction, to thereby obtain a release film having a thickness of 38 μm and a thickness of the resin layer of about 0.08 μm.

The release films obtained in Examples and Comparative Examples were evaluated variously, and the results are shown in Table 1.

TABLE 1

| | | Resin Layer-Forming Liquid Material | | | | | | | Substrate | | Characteristics of Release Film | | | | | | | |
|---|---|---|---|---|---|---|---|---|---|---|---|---|---|---|---|---|---|---|
| | | Acid-Modified Polyolefin Resin | | Polyvinyl Alcohol | | | Crosslinking Agent | | | | Film | | Fine Nonplanar Shapes of Resin Layer Surface | | Releasability | | | | Peeling |
| | | Kind | parts by mass | Kind | Saponification rate (%) | parts by mass | Kind | parts by mass | Stability of Liquid Material | Constituting Resin | Application System | Evaluation Method A Presence/absence | Evaluation Method B places/m | Adhesiveness | Acrylic Pressure Sensitive Adhesive Agent | | Epoxy Prepreg Peel Force N/cm | Warpage mm | Electrification Presence/absence |
| | | | | | | | | | | | | | | | Peel Force N/cm | Residual Adhesion Rate % | | | |
| Example | 1 | A-1 | 100 | JP-15 | 88.0 | 300 | WS700 | 7 | Fair | PET | Inline | Absent | 0.1 | 100/100 | 2.3 | 82 | 0.08 | 0.3 | Absent |
| | 2 | A-1 | 100 | JT-05 | 94.5 | 300 | WS700 | 7 | Good | PET | Inline | Absent | 0 | 100/100 | 2.2 | 81 | 0.07 | 0.0 | Absent |
| | 3 | A-1 | 100 | JT-05 | 94.5 | 500 | WS700 | 7 | Good | PET | Inline | Absent | 0 | 100/100 | 2.0 | 82 | 0.07 | 0.0 | Absent |
| | 4 | A-1 | 100 | JF-10 | 98.5 | 300 | WS700 | 7 | Good | PET | Inline | Absent | 0.8 | 100/100 | 2.2 | 81 | 0.07 | 0.7 | Absent |
| | 5 | A-1 | 100 | JF-05 | 98.5 | 300 | WS700 | 7 | Good | PET | Inline | Absent | 0.7 | 100/100 | 2.1 | 81 | 0.08 | 0.7 | Absent |
| | 6 | A-2 | 100 | JT-05 | 94.5 | 210 | WS700 | 7 | Good | PET | Inline | Absent | 0 | 100/100 | 2.9 | 82 | 0.03 | 0.0 | Absent |
| | 7 | A-2 | 100 | JT-05 | 94.5 | 300 | WS700 | 7 | Good | PET | Inline | Absent | 0 | 100/100 | 2.2 | 83 | 0.03 | 0.0 | Absent |
| | 8 | A-2 | 100 | JT-05 | 94.5 | 500 | WS700 | 7 | Good | PET | Inline | Absent | 0 | 95/100 | 2.3 | 84 | 0.02 | 0.0 | Absent |
| | 9 | A-2 | 100 | JT-05 | 94.5 | 900 | WS700 | 7 | Good | PET | Inline | Absent | 0.2 | 100/100 | 2.2 | 74 | 0.02 | 0.2 | Absent |
| | 10 | A-2 | 100 | JL-05E | 82.0 | 500 | WS700 | 7 | Fair | PET | Inline | Absent | 0 | 100/100 | 2.2 | 82 | 0.04 | 0.1 | Absent |
| | 11 | A-2 | 100 | JP-15 | 88.0 | 500 | WS700 | 7 | Fair | PET | Inline | Absent | 0.1 | 100/100 | 2.3 | 81 | 0.03 | 0.0 | Absent |
| | 12 | A-2 | 100 | JM-17 | 95.0 | 500 | WS700 | 7 | Good | PET | Inline | Absent | 0.1 | 100/100 | 2.2 | 83 | 0.02 | 0.0 | Absent |
| | 13 | A-2 | 100 | JT-05 | 94.5 | 500 | WS700 | 1.5 | Fair | PET | Inline | Absent | 0 | 90/100 | 2.3 | 71 | 0.03 | 0.0 | Absent |
| | 14 | A-2 | 100 | JT-05 | 94.5 | 500 | WS700 | 18 | Fair | PET | Inline | Absent | 0 | 100/100 | 2.8 | 82 | 0.13 | 0.0 | Absent |
| | 15 | A-2 | 100 | JT-05 | 94.5 | 500 | V-02-L2 | 5 | Good | PET | Inline | Absent | 0 | 98/100 | 2.4 | 76 | 0.03 | 0.0 | Absent |
| | 16 | A-2 | 100 | JT-05 | 94.5 | 600 | HW-100 | 5 | Fair | PET | Inline | Absent | 0 | 97/100 | 2.3 | 75 | 0.07 | 0.0 | Absent |
| | 17 | A-2 | 100 | JT-05 | 94.5 | 500 | WS700 | 5 | Fair | PET | Offline | Absent | 0 | 98/100 | 2.7 | 80 | 0.04 | 0.0 | Absent |
| | 18 | A-2 | 100 | JT-05 | 94.5 | 500 | WS700 | 7 | Good | PBT | Inline | Absent | 0 | 93/100 | 2.3 | 73 | 0.03 | 0.0 | Absent |
| | 19 | A-2 | 100 | JT-05 | 94.5 | 500 | WS700 | 7 | Good | Ny | Inline | Absent | 0 | 90/100 | 2.8 | 70 | 0.09 | 0.0 | Absent |
| | 20 | A-3 | 100 | JT-05 | 94.5 | 500 | WS700 | 7 | Good | PET | Inline | Absent | 0 | 100/100 | 2.1 | 80 | 0.16 | 0.0 | Absent |
| Comparative Example | 1 | A-1 | 100 | VC-10 | 99.4 | 500 | WS700 | 7 | Fair | PET | Inline | Absent | 2.0 | 100/100 | 2.4 | 82 | 0.07 | 3.5 | Present |
| | 2 | A-2 | 100 | VC-10 | 99.4 | 500 | WS700 | 7 | Fair | PET | Inline | Absent | 2.3 | 100/100 | 2.5 | 83 | 0.07 | 3.4 | Present |
| | 3 | A-2 | 100 | JT-05 | 94.5 | 5 | WS700 | 7 | Fair | PET | Inline | Absent | 0 | 30/100 | 2.3 | 51 | 0.03 | 0.0 | Absent |
| | 4 | A-2 | 100 | JT-05 | 94.5 | 1100 | WS700 | 7 | Good | PET | Inline | Absent | 1.1 | 87/100 | 2.4 | 65 | 0.03 | 0.3 | Absent |
| | 5 | A-2 | 100 | JT-05 | 94.5 | 500 | WS700 | 0.3 | Good | PET | Inline | Absent | 0.3 | 75/100 | 2.4 | 52 | 0.03 | 0.0 | Absent |
| | 6 | A-2 | 100 | JT-05 | 94.5 | 500 | WS700 | 30 | Fail | PET | Inline | Absent | 0.1 | 100/100 | 3.3 | 82 | 0.25 | 0.0 | Absent |
| | 7 | A-3 | 100 | VC-10 | 99.4 | 500 | WS700 | 7 | Fair | PET | Inline | Absent | 2.5 | 100/100 | 2.2 | 80 | 0.15 | 3.4 | Present |

With respect to continuous streaky and discrete fine nonplanar shapes of the resin layers of the release films of Examples 1 to 20, by the evaluation method A, no generation of continuous streaky and discrete fine nonplanar shapes of several tens nm to several hundred nm in height was confirmed; and also by the evaluation method B, the number of continuous streaky and discrete fine nonplanar shapes of several tens nm to several hundred nm in height was 1.0 place/m or smaller; the release films thus had higher-quality coating film uniformity. Further even when the release films were stored in a high-humidity environment, warpage of the release films was reduced to such a level as to be able to be practically used; and even when the release films were peeled in a low-humidity environment, no peeling electrification was generated. Further, the releasability from the acrylic pressure-sensitive adhesive agent and also the epoxy prepreg was good and the residual adhesion rate with respect to the acrylic pressure-sensitive adhesive agent was good.

Among these, the resin layers of the release films of Examples 2, 3 and 6 to 8 were ones containing a polyvinyl alcohol having a saponification rate in an especially preferable range in a more preferable content range, wherein in the evaluation method B, continuous streaky and discrete fine nonplanar shapes of several tens nm to several hundred nm in height were not confirmed at all, and the warpage in a high-humidity environment was also controlled.

Then, the release films of Examples 6 to 12, since the propylene ratio in the olefin component of an acid-modified polyolefin resin constituting the resin layers was high as compared with the release films of the other Examples, were excellent in releasability from the epoxy prepreg.

In the release films of Comparative Examples 1, 2 and 7, since the resin layers containing a polyvinyl alcohol having a saponification rate exceeding 99% were provided, in the evaluation method A, which used a low-luminance light source and had low precision, no generation of continuous streaky and discrete fine nonplanar shapes of several tens nm to several hundred nm in height was confirmed, but in the evaluation method B, which used a high-luminance light source and had high precision, many continuous streaky and discrete fine nonplanar shapes of several tens nm to several hundred nm in height were confirmed. Further, the warpage was large in a high-humidity environment, and the peeling electrification was generated in a low-humidity environment.

In the release film of Comparative Example 3, since the content of the polyvinyl alcohol in the resin layer did not meet the range specified in the present invention, the adhesiveness between the substrate film and the resin layer was low, and the resin layer moved to the acrylic pressure-sensitive adhesive agent after peeling, and the residual adhesion rate was low. Further in the release film of Comparative Example 4, since the content of a polyvinyl alcohol in the resin layer exceeded the range specified in the present invention, in the evaluation method B, which used a high-luminance light source and had high precision, many continuous streaky and discrete fine nonplanar shapes of several tens nm to several hundred nm in height were confirmed.

In the release film of Comparative Example 5, since the content of the crosslinking agent in the resin layer did not meet the range specified in the present invention, the adhesiveness between the substrate film and the resin layer was low, so in the evaluation of the peel force, peeling did not occur between the pressure-sensitive adhesive tape and the resin layer, but occurred between the substrate film and the resin layer in some cases. Further the resin layer moved to the acrylic pressure-sensitive adhesive agent after peeling, and the residual adhesion rate was low. Further in the release film of Comparative Example 6, since the content of the crosslinking agent in the resin layer exceeded the range specified in the present invention, the resin layer-forming liquid material increased in the viscosity with time and was low in stability, and the formed resin layer was inferior in the releasability.

The invention claimed is:

1. A release film comprising a substrate film and a resin layer provided on at least one surface of the substrate film, wherein
   the resin layer comprises 100 parts by mass of an acid-modified polyolefin resin, 1 to 20 parts by mass of a crosslinking agent and 10 to 1,000 parts by mass of a polyvinyl alcohol having a saponification rate of 90% or higher and lower than 98%, and
   a content of propylene in an olefin component of the acid-modified polyolefin resin is 50% by mass or higher.

2. The release film according to claim 1, wherein an olefin component of the acid-modified polyolefin resin comprises ethylene and propylene.

3. The release film according to claim 1, wherein a content of propylene in an olefin component of the acid-modified polyolefin resin is 95% by mass or higher.

4. The release film according to claim 1, wherein a peel force between the resin layer and an acrylic adherend as measured by pasting the acrylic adherend to the resin layer is 3.0 N/cm or lower.

5. The release film according to claim 1, wherein a resin constituting the substrate film is a polyester.

6. A method for manufacturing a release film according to claim 1, the method comprising drying and stretching a film comprising a substrate film and a resin layer-forming liquid material applied to the substrate film, wherein
   the resin layer-forming liquid material comprises 100 parts by mass of an acid-modified polyolefin resin, 1 to 20 parts by mass of a crosslinking agent and 10 to 1,000 parts by mass of a polyvinyl alcohol having a saponification rate of 90% or higher and lower than 98%, and
   a content of propylene in an olefin component of the acid-modified polyolefin resin is 50% by mass or higher.

* * * * *